United States Patent [19]

McLaughlin

[11] 4,300,275
[45] Nov. 17, 1981

[54] METHOD OF MANUFACTURING A RADIANT ENERGY COLLECTING OR EMITTING ELEMENT

[75] Inventor: Jay C. McLaughlin, Santa Rosa, Calif.

[73] Assignee: General Thermal Corporation, Santa Rosa, Calif.

[21] Appl. No.: 2,997

[22] Filed: Jan. 12, 1979

Related U.S. Application Data

[62] Division of Ser. No. 857,133, Dec. 5, 1977, Pat. No. 4,217,886.

[51] Int. Cl.³ .............................................. B23P 15/26
[52] U.S. Cl. .................. 29/157.3 C; 72/370; 72/103; 29/727; 29/521; 29/523; 29/157.3 A; 29/157.3 R; 138/143; 165/177
[58] Field of Search ................ 126/271, 446, 442; 29/523, 521, 157.3 V, 157.3 C, 157.4, 726, 727, 157.3 D, 157.3 R, 157.3 A; 165/180, 177; 138/143; 72/75, 103, 370

[56] References Cited

U.S. PATENT DOCUMENTS

| 942,184 | 12/1909 | Persons | 29/523 X |
| 3,428,338 | 2/1969 | Corwin | 29/157.4 |
| 3,467,180 | 9/1969 | Pensotti | 29/523 X |
| 3,517,536 | 6/1970 | Fitzmaurice | 29/727 |
| 4,083,093 | 4/1978 | Chertok | 29/157.3 V |
| 4,154,464 | 5/1979 | Stary | 29/523 |

FOREIGN PATENT DOCUMENTS 2340974  2/1975  Fed. Rep. of Germany ........ 29/523

Primary Examiner—Nicholas P. Godici
Assistant Examiner—V. K. Rising
Attorney, Agent, or Firm—Flehr, Hohbach, Test, Albritton & Herbert

[57] ABSTRACT

A radiant energy collecting/emitting element, including an absorber plate with a cylindrical bore through which a tool comprising a mandrel having lands is drawn to form helical grooves. A tube formed of a ductile metal dissimilar to the plate metal is placed within the bore and a second tool is then drawn through the tube. The second tool has an outer diameter greater than the inner diameter of the tube so that the tube is radially expanded outwardly into intimate surface contact with the bore. During expansion the material of the tube cold flows into the grooves to form lands which lock the tube against displacement relative to the plate.

4 Claims, 13 Drawing Figures

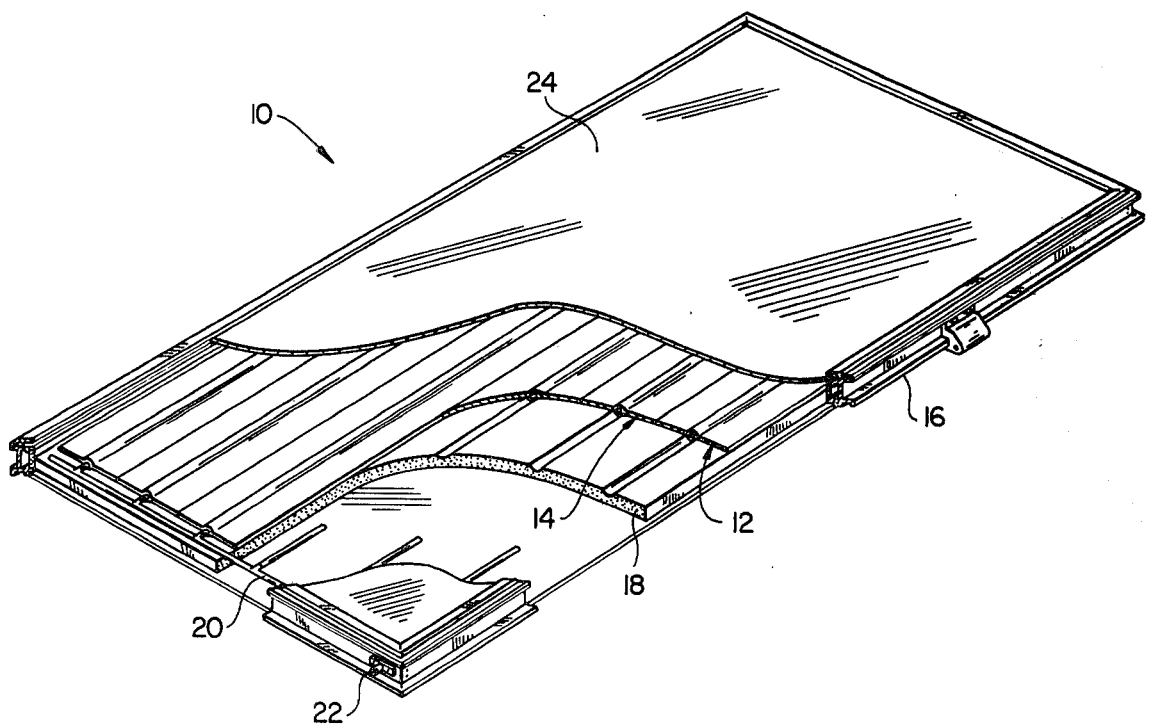
FIG_1
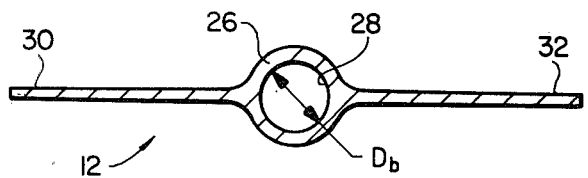
FIG_2
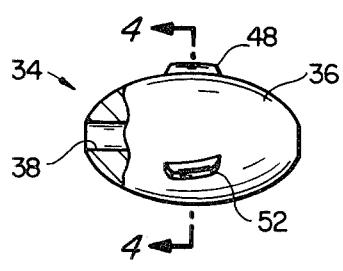
FIG_3
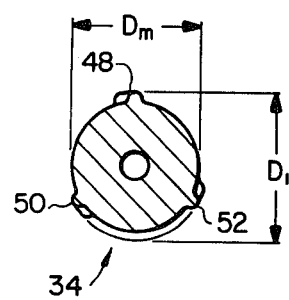
FIG_4

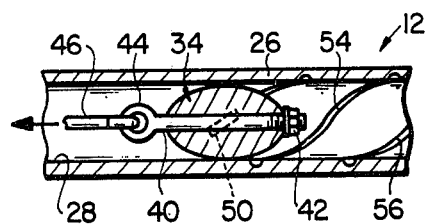
FIG_5
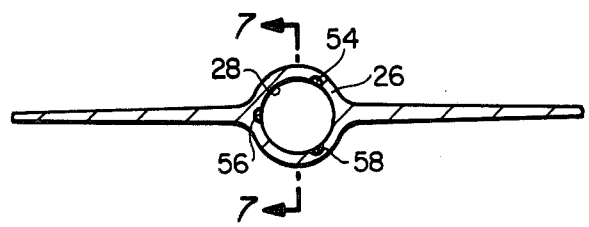
FIG_6
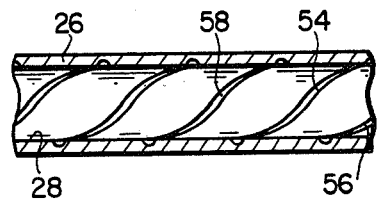
FIG_7
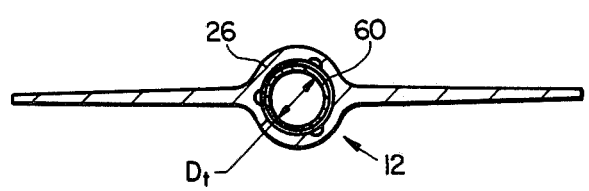
FIG_8
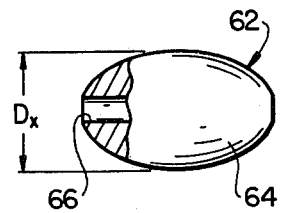
FIG_9
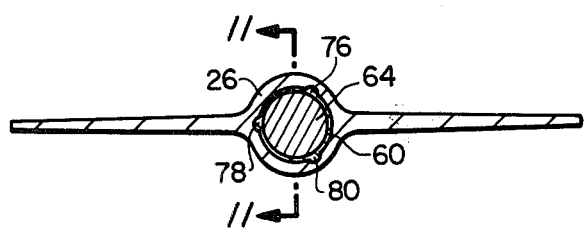
FIG_10
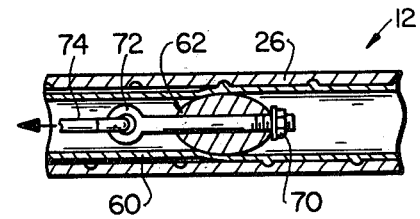
FIG_11
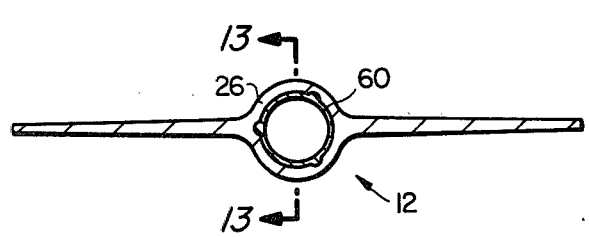
FIG_12
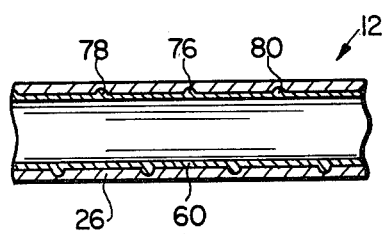
FIG_13

METHOD OF MANUFACTURING A RADIANT ENERGY COLLECTING OR EMITTING ELEMENT

This is a division of application Ser. No. 857,133 filed Dec. 5, 1977 now U.S. Pat. No. 4,217,886.

BACKGROUND OF THE INVENTION

This invention relates in general to radiant energy collecting or emitting apparatus, and in particular relates to radiant energy absorber/emitter elements of the flat plate type and methods and tools for the manufacture thereof.

Various types of flat plate radiant energy collecting and emitting devices have heretofore been provided. Among these devices are flat plate solar energy collectors in which flat metal plates exposed to solar energy are formed integral with or are connected to tubes or pipes through which a heat exchange fluid is directed. One example is U.S. Pat. No. 3,448,798 to Coe which provides a method for attaching coolant tubing to the surface of a thermal energy conducting element.

In many cases it is desirable to form the solar energy collecting plate of a material having good heat conduction properties but which is relatively inexpensive, such as aluminum, while forming the heat exchange fluid tubing of another material also having good thermal conduction properties but which is more compatible with the fluid, such as copper. In such cases it has been difficult to assemble the tubing on the plate so that there is intimate heat exchange contact at the surfaces for maximizing heat flow. One problem which has been encountered is that where the plate is extruded from metals such as aluminum it is not possible to control close tolerances inexpensively so that a close fit between the tubing and plate is not easily attained. In an arrangement in which projections on a plate are swaged about the tubing, as in the above-mentioned Coe patent, an opening is formed at the seam along the swaged projections such that moisture, oxygen or other matter can enter through the seam and spread between the tubing and plate to cause oxidation and the like which attenuates heat transfer. Another problem is that the tubing can displace relative to the plate under changing thermal and mechanical stresses so that there is a loss in surface contact and further attenuation in heat conduction between the tubing and collector plate.

OBJECTS AND SUMMARY OF THE INVENTION

It is a general object of the invention to provide a new and improved radiant energy collecting or emitting element of the flat plate type.

Another object is to provide a radiant energy absorber/emitter plate assembled in intimate surface contact with tubing which carries a heat exchange fluid, and in which the tubing is locked against displacement relative to the plate.

Another object is to provide a method of forming a radiant energy collecting or emitting element of the type described.

Another object is to provide a tool for the manufacture of a radiant energy collecting or emitting element of the type described.

The invention in summary includes an outer member from which radiant energy collecting/emitting surfaces project. A tubular inner member is mounted with its outer surface in intimate heat exchange contact against a central bore of the outer member, and helical lands on the inner member project outwardly into interfitting engagement with helical grooves formed in the bore. A tool comprising a mandrel having outwardly projecting lands is drawn through a bore to form the grooves and to size the bore inner diameter. Another tool comprising a mandrel having a cross-section of a diameter greater than the inner diameter of the inner member is drawn through the latter which expands and cold flows into the grooves.

BRIEF DESCRIPTION OF THE DRAWINGS

FIG. 1 is a perspective view of a solar energy collector incorporating radiant energy collecting elements according to the invention.

FIG. 2 is a cross-sectional view of an element employed in the collector of FIG. 1.

FIG. 3 is a side view of a tool used in a method for forming grooves in the bore of the element of FIG. 2.

FIG. 4 is a cross-sectional view taken along the line 3—3 of FIG. 3.

FIG. 5 is an axial section view of the element of FIG. 2 illustrating the method using the tool of FIG. 3.

FIG. 6 is a cross-sectional view of the element of FIG. 7 showing the grooves.

FIG. 7 is an axial section view taken along the line 7—7 of FIG. 6.

FIG. 8 is a cross-sectional view of the element of FIG. 5 showing the method step of inserting the tubular inner member.

FIG. 9 is a side view of another tool employed in the method of the invention.

FIG. 10 is a cross-sectional view similar to FIG. 8 showing the method of using the tool of FIG. 9.

FIG. 11 is an axial section view taken along the line 11—11 of FIG. 10.

FIG. 12 is a view similar to FIG. 10 showing an assembled radiant energy collecting/emitting element of the invention.

FIG. 13 is a cross-sectional view taken along the line 13—13 of FIG. 12.

DESCRIPTION OF THE PREFERRED EMBODIMENTS

In the drawings FIG. 1 illustrates generally at 10 a solar energy collector of the flat plate type incorporating a plurality of collector elements 12, 14 made in accordance with the invention. Solar energy collector 10 is illustrated as a typical example of an end use application for the collector elements of the invention, and it is understood that the invention will also have use as radiant energy collecting or emitting elements in other applications. For example, the elements could be used as flat plate targets in focusing collectors, or they could be used as heat sink radiators.

Collector 10 includes an outer perimeter frame 16 which mounts a flat back plate together with a layer of insulation 18, which can be closed cell plastic material such as isocyanurate. A plurality of the collector elements 12, 14 are mounted in abutting, side-by-side relationship across the upper surface of the insulation. Header tubing 20 mounted at opposite ends of the frame connect opposite ends of the elements in parallel flow for a heat exchange fluid, such as water. The headers lead to inlet/outlet connections 22 which are coupled at opposite ends of the frame with suitable tubing, not shown, leading to and from other components of the solar collector system. A transparent cover plate 24 of a material such as tempered glass is mounted across the frame in spaced relationship above the collector elements.

The typical collector element 12 is shown in final assembled configuration in FIGS. 12 and 13. FIGS. 2 through 11 illustrate the steps and tools employed in the method of forming the assembled element.

The first step of the method employs an absorber/emitter plate blank 25 having a cross-sectional shape shown in FIG. 2. Preferably the blank is extruded from a suitable metal, such as aluminum, having a relatively high coefficient of thermal conductivity. The blank is extruded into an elongate cylindrical outer member 26 having a coaxial center bore 28 together with a pair of diametrically opposed, radially outwardly extending wings 30, 32 which form flat surfaces for collecting or emitting radiant energy. Each of the wings can be formed with a taper which increases in width toward member 26 for accommodating increased heat flow toward the center.

The next step in the method employs a tool comprising the mandrel 34 of FIGS. 3 and 4. The mandrel is formed with a tear-shaped body 36 having a circular cross-section and a generally oval longitudinal section. A bore 38 is formed coaxially through the body for mounting about a spindle 40 (FIG. 5). One end of the spindle is threaded for receiving a nut 42 which captures the mandrel on the spindle, and the opposite end is formed with an eye 44 through which the end of a pull rod 46 is attached. The bore of the mandrel body is free to rotate about the spindle, although the body could be keyed to the spindle with the spindle mounted through a suitable swivel connection on the pull rod to permit rotation of the mandrel. A plurality, shown as three, of lands 48, 50 and 52 are formed integral with and circumferentially spaced about the mandrel body. The outer diameter $D_l$ of the lands is sized greater than the bore inner diameter $D_b$ of the plate blank, and the major axis of each land is inclined at an angle from the longitudinal axis of the mandrel so that the lands lie in helical paths of the same rotational sense about the mandrel. In the illustrated embodiment the lands follow a helix of right hand sense although they could follow a helix of let hand sense.

The outer diameter $D_m$ of the peripheral surface of the mandrel body between the lands is sized to be somewhat larger than the maximum tolerance of bore inner diameter $D_b$. The mandrel is formed of a suitable durable, high-strength material such as high carbon steel over which close dimensional tolerance control can be achieved and which is capable of work forming by cold flow the relatively softer material of the extrusion blank.

In the method helical grooves 54, 56 and 58 are formed along the inner surface of plate bore 28 by pulling the mandrel along the length of the bore in the manner illustrated in FIG. 5. Movement of the mandrel through the bore causes the lands to press into and form by cold flow the three circumferentially spaced grooves. As the mandrel advances the coaction between the inclined lands and the bore causes the mandrel to rotate about spindle 40 so that the lands cut helical paths as shown in FIGS. 6 and 7. Also as the mandrel advances its surface portion between the lands expands or enlarges by cold flow the bore to an inner diameter commensurate with the mandrel diameter $D_m$. The bore diameter is thereby sized to a dimension having a tolerance commensurate with the controlled tolerance of the mandrel.

In the next step a hollow cylindrical inner member or flow tube 60 is inserted within the bore of absorber plate 24. Tube 60 is formed of a suitable ductile metal having a relatively high coefficient of thermal conductivity. A copper tube is preferred in that in addition to having good heat conduction properties the copper metal is compatible with commonly available heat exchange fluids, such as water. Copper tubing is also available with closely controlled dimensional tolerances. Thus the tubing outer diameter can be sized commensurate with the expanded bore inner diameter so that the tubing can be freely inserted leaving small clearances between the two members. FIG. 8 illustrates the tubing after insertion into the absorber plate.

The next step of the method employs the tool of FIG. 9 which comprises a smooth surface mandrel 62 formed with a tear-shaped body 64 having a circular cross-section and a generally oval longitudinal section. A central bore 66 is formed through the mandrel and the bore rotatably mounts on a spindle 68 (FIG. 11). A nut 70 is threaded on the end of the spindle to capture the mandrel, and an opposite end of the spindle is formed with an eye 72 through which a pull rod 74 is connected. The mandrel is formed of a suitable durable, high-strength material such as high carbon steel and its outer diameter $D_x$ is sized somewhat larger than the inner diameter $D_t$ of tube 60. The mandrel is pulled in one continuous step within the tube along its length so that the tube wall cold flows outwardly with the tube outer surface pressed into intimate contact with the bore inner surface to establish good thermal heat exchange contact. Portions of the tube material also cold flow through the voids of the grooves to form helical lands 76, 78 and 80 which conform with the grooves. The tube lands thereby are embedded to mechanically interlock the tube with the absorber plate. This interlock between the lands and grooves precludes relative displacement between the tube and plate which could otherwise occur due to mechanical and/or thermal stresses. FIGS. 12 and 13 illustrate collector element 12 following the step of drawing mandrel 62 through the tube.

The use and operation of the invention is as follows. An extruded blank 24 of aluminum is formed with helical grooves along its inner bore by drawing mandrel 34 along its length as explained in connection with FIG. 5. A copper tube 60 is then inserted within the bore and the mandrel 62 is drawn into the tube in the manner explained in connection with FIG 11. The outer surface of wings 30, 32 of the assembled collector plate which are to be exposed to incident radiant energy, or which are to act as a radiator, can then be coated with a selected surface material having a high absorptivity coefficient, where the plate is a collector, or a high emissivity coefficient, where the plate is a radiator. The resulting collector plate is without seams or openings so that the coating can be applied uniformly without discontinuity across the surface.

The assembled collector plate provides intimate surface contact between tubing and plates which are of dissimilar metals. Thus the collector can be fabricated by using aluminum, which is relatively inexpensive, for the larger amount of material required for the plate structure, while using copper, which is relatively more expensive, for the tubing so that overall costs are reduced. Further costs savings are achieved because the invention permits the use of an extruded plate structure having relatively poor tolerance control. Despite the initially poor tolerances, when finally assembled the plate structure is in intimate surface contact with the tubing for good thermal conductance so that heat flow is optimum. The grooves in the plate structure and lands on the tubing are formed in a minimum number of steps, and in the assembled unit the tubing and plate are interlocked to maintain mechanical integrity, i.e. preclude relative longitudinal and rotary displacement so that changing mechanical and thermal stresses do not cause a separation of the intimate surface contact between the tube and bore.

While the foregoing embodiments are at present considered to be preferred it is understood that numerous variations and modifications may be made therein by those skilled in the art and it is intended to cover in the appended claims all such variations and modifications as fall within the true spirit and scope of the invention.

What is claimed is:

1. A method of manufacturing a radiant energy collecting or emitting element comprising the steps of forming grooves along the central bore of an absorber/emitter plate by drawing a mandrel through the bore with the mandrel including peripheral lands having an outer diameter greater than the inner diameter of the bore whereby the lands cold form the grooves, placing a ductile tube coaxially within the bore, and expanding the tube radially outwardly into intimate surface contact along the length of the bore and into the grooves to form lands which interlock with the grooves to preclude relative displacement between the tube and the plate.

2. A method of manufacturing a radiant energy collecting or emitting element comprising the steps of forming grooves along helical paths within the central bore of an absorber/emitter plate, said grooves being formed by drawing a mandrel through the bore, said mandrel having peripheral lands with an outer diameter greater than the inner diameter of the bore whereby the lands cold form the grooves and with the longitudinal axes of the lands extending at an angle inclined lengthwise of the mandrel whereby coaction between the lands and bore causes the mandrel to rotate about its longitudinal axis as it is drawn through the bore and the lands cold form the grooves along the helical paths, placing a ductile tube coaxially within the bore, and expanding the tube radially outwardly into intimate surface contact along the length of the bore and into the grooves to form lands which interlock with the grooves to preclude relative displacement between the tube and the plate.

3. A method of manufacturing a radiant energy collecting or emitting element comprising the steps of forming grooves along the central bore of constant inner diameter of an absorber/emitter plate formed of aluminum, with the grooves being formed by drawing a mandrel through the plate bore and with the mandrel having a plurality of circumferentially spaced lands which are inclined helically of the mandrel with the lands coacting with the plate bore to rotate the mandrel as it is drawn through the bore so that the lands cold form helical grooves in the bore, placing a ductile tube coaxially within the bore, said tube being formed of copper and having a coaxial bore of constant inner diameter, and expanding the tube by drawing a mandrel through the tube bore with the outer diameter of the mandrel being greater than the inner diameter of the tube bore whereby the tube expands radially outwardly into intimate surface contact along the length of the bore to form lands which interlock with the grooves to preclude relative displacement between the tube and the plate.

4. The method of manufacturing a radiant energy collecting or emitting element comprising the steps of forming helical grooves along the central bore of an absorber/emitter plate by drawing a mandrel through the bore with the mandrel having peripheral lands with an outer diameter greater than the inner diameter of the bore, the lands being circumferentially spaced and with the mandrel having smooth surface portions extending along helical paths between the lands, whereby the lands cold form the grooves and with the smooth surface portion of the mandrel forming corresponding smooth surface portions along helical paths in the bore between the grooves, placing a ductile tube coaxially within the bore, and expanding the tube radially outwardly into intimate surface contact with the smooth surface portions of the bore and into the grooves to form helical tube lands which interlock with the grooves to preclude relative displacement between the tube and the plate.

* * * * *